United States Patent
Yadava et al.

(10) Patent No.: US 12,481,763 B2
(45) Date of Patent: Nov. 25, 2025

(54) SYSTEM AND METHOD FOR REGULATING ACCESS TO SECURE FUNCTIONS

(71) Applicant: NXP B.V., Eindhoven (NL)

(72) Inventors: Gulab Chandra Yadava, Bangalore (IN); Giten Kulkarni, Pune (IN)

(73) Assignee: NXP B.V., Eindhoven (NL)

( * ) Notice: Subject to any disclaimer, the term of this patent is extended or adjusted under 35 U.S.C. 154(b) by 140 days.

(21) Appl. No.: 18/596,827

(22) Filed: Mar. 6, 2024

(65) Prior Publication Data
US 2025/0190571 A1  Jun. 12, 2025

(30) Foreign Application Priority Data
Dec. 6, 2023  (IN) .............................. 202341083268

(51) Int. Cl.
G06F 21/00 (2013.01)
G06F 21/54 (2013.01)
G06F 21/57 (2013.01)
G06F 21/78 (2013.01)

(52) U.S. Cl.
CPC ............ G06F 21/575 (2013.01); G06F 21/54 (2013.01); G06F 21/78 (2013.01)

(58) Field of Classification Search
None
See application file for complete search history.

(56) References Cited

U.S. PATENT DOCUMENTS

| | | | |
|---|---|---|---|
| 10,021,104 B2 | 7/2018 | Rösner et al. | |
| 10,333,967 B2 | 6/2019 | Litva et al. | |
| 10,747,900 B1* | 8/2020 | Bendersky | G06F 21/6245 |
| 11,003,797 B2 | 5/2021 | Nitsch et al. | |
| 11,748,481 B1* | 9/2023 | Hamlin | G06F 21/575 |
| | | | 726/25 |
| 12,406,054 B2* | 9/2025 | Terpstra | G06F 21/51 |
| 2011/0010543 A1* | 1/2011 | Schmidt | H04W 12/06 |
| | | | 713/168 |

(Continued)

FOREIGN PATENT DOCUMENTS

| | | |
|---|---|---|
| CN | 111147428 A | 5/2020 |
| EP | 3629150 A1 | 4/2020 |

OTHER PUBLICATIONS

Duque Anton, Anna L. et al. Fault Attacks on Access Control in Processors: Threat, Formal Analysis and Microarchitectural Mitigation. IEEE Access, vol. 11. https://ieeexplore.ieee.org/stamp/stamp.jsp?tp=&arnumber=10138190 (Year: 2023).*

(Continued)

Primary Examiner — Jeremiah L Avery (57) ABSTRACT

A secure element may be coupled to a host and detects a reboot state of the host based on a state of a reset alert signal received from the host. The secure element further generates a reboot flag indicative of a reset operation of the host. Further, the secure element receives an access request from the host to access a plurality of secure functions of the secure element. Based on the access request, the secure element may determine an authorization state between the host and the secure element. The secure element regulates access of the host to the plurality of secure functions based on a status of the reboot flag and the authorization state.

20 Claims, 6 Drawing Sheets

(56) References Cited

U.S. PATENT DOCUMENTS

| | | | |
|---|---|---|---|
| 2012/0290870 A1* | 11/2012 | Shah | G06F 21/575 |
| | | | 714/E11.073 |
| 2019/0065752 A1* | 2/2019 | Li | G06F 1/3296 |
| 2019/0303305 A1* | 10/2019 | Mesropian | G06F 21/44 |
| 2021/0089385 A1* | 3/2021 | Basuta | G06F 12/10 |
| 2021/0224386 A1* | 7/2021 | Teglia | G06F 21/554 |
| 2021/0390185 A1 | 12/2021 | Rogala | |
| 2022/0027474 A1 | 1/2022 | Street et al. | |
| 2023/0229778 A1* | 7/2023 | Terpstra | G06F 21/73 |
| | | | 713/2 |
| 2023/0229779 A1* | 7/2023 | Terpstra | G06F 8/63 |
| | | | 713/2 |

OTHER PUBLICATIONS

Sarmah, Mrinal J. et al. Methods for Booting an All Programmable System-on-Chip Over PCI Express Link. 2017 IEEE International Conference on Computational Intelligence and Computing Research (ICCIC). https://ieeexplore.ieee.org/stamp/stamp.jsp?tp=&arnumber=8524555 (Year: 2017).*

Hounsinou, Sena et al. Work-in-Progress: Enabling Secure Boot for Real-Time Restart-Based Cyber-Physical Systems. 021 IEEE Real-Time Systems Symposium (RTSS). https://ieeexplore.ieee.org/stamp/stamp.jsp?tp=&arnumber=9622397 (Year: 2021).*

Android Specification "Velocity", downloaded and excerpted from https://source.android.com/docs/security/features/keystore/features#root_of_trust_binding, Sep. 13, 2022, 1 page.

* cited by examiner

SYSTEM AND METHOD FOR REGULATING ACCESS TO SECURE FUNCTIONS

CROSS-REFERENCE TO RELATED APPLICATIONS

This application claims priority under 35 U.S.C. § 119 to Indian Patent Application number 202341083268, filed 6 Dec. 2023, the contents of which are incorporated by reference herein.

FIELD OF USE

The present disclosure relates generally to electronic circuits, and, more particularly, to a system and method for regulating access to secure functions.

BACKGROUND

An electronic device includes a host and a secure element. The host authorizes secure applications in the secure element to establish trust with the secure element at each reboot cycle of the device. An authorization state indicative of the execution of the authorization for the secure applications is thus persistently stored in the secure element at each reboot cycle. In an event that the security of the device is compromised due to an attack by a malicious operating system (OS), the malicious OS can gain access to the secure applications as the authorization state associated with a previous reboot cycle indicates that the secure application is authorized. Thus, unauthorized extraction of sensitive data and execution of unauthorized operations within the secure element occur.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

In an electronic device, an authorization between a host and a secure element is a fundamental security mechanism that is executed to protect a plurality of secure functions and sensitive data of the secure element. The authorization ensures safeguarding the secure functions against unauthorized access thereby reducing potential security breaches. The secure element stores an authorization state of the host based on the authorization between the host and the secure element. The security of the electronic device thus relies on the authorization between the host and the secure element. However, the authorization may be bypassed by malicious software in the host or any other means. This may lead to unauthorized access to the plurality of secure functions and sensitive data as in conventional devices, the pre-existing authorization state remains unchanged.

Various embodiments of the present disclosure disclose an integrated circuit (IC). The IC may include a detector, a secure memory, and a control circuit. The detector may be coupled to a host and the secure memory. Further, the detector may be configured to receive a reset alert signal from the host. Based on a state of the reset alert signal, the detector may be further configured to detect a reboot state of the host. The detector may be further configured to generate a reboot flag that indicates the reboot state of the host. The secure memory may be configured to store the reboot flag. The control circuit may be coupled to the host, the secure memory, and the detector. The control circuit may be configured to receive an access request from the host to access a plurality of secure functions of the IC. The control circuit may be further configured to determine a status of the reboot flag based on the reception of the access request. The status of the reboot flag may be indicative of one of (i) the reset operation of the processor when the reboot flag is set (e.g., the reboot flag is set to one), and (ii) a normal operation of the processor when the reboot flag is reset (e.g., the reboot flag is set to zero). Additionally, the control circuit may be further configured to determine an authorization state of the host indicative of an authorization between the control circuit and the host. Based on the status of the reboot flag and the authorization state, the control circuit may be further configured to regulate access of the host to the plurality of secure functions.

The detector and the control circuit add an extra security layer to the electronic device. The detector may detect the reboot state of the processor based on the state of the reset alert signal. In the event of an attack by a malicious software that gains control of the host, the control circuit restricts access to such software based on the determination of absence of the authorization or failure of the authorization after the reset operation of the host. Thus, the malicious software is unable to access the secure functions of the device and a safety of the electronic device remains uncompromised. For genuine applications of the host trying to gain access to the plurality of secure applications, the authorization between the control circuit and the host serves as a deterministic factor to grant access to the host to the plurality of secure applications after the reset operation of the host. The control circuit may grant access to the plurality of secure applications to at least one of the plurality of host applications when the authorization between the host and the control circuit after the reset operation of the host is successful. Similarly, for various remote internet of things (IoT) devices that may control secure operations, such devices may be authorized remotely after every reset operation to ensure that the security of the underlying secure operations remains uncompromised.

Figure 1:
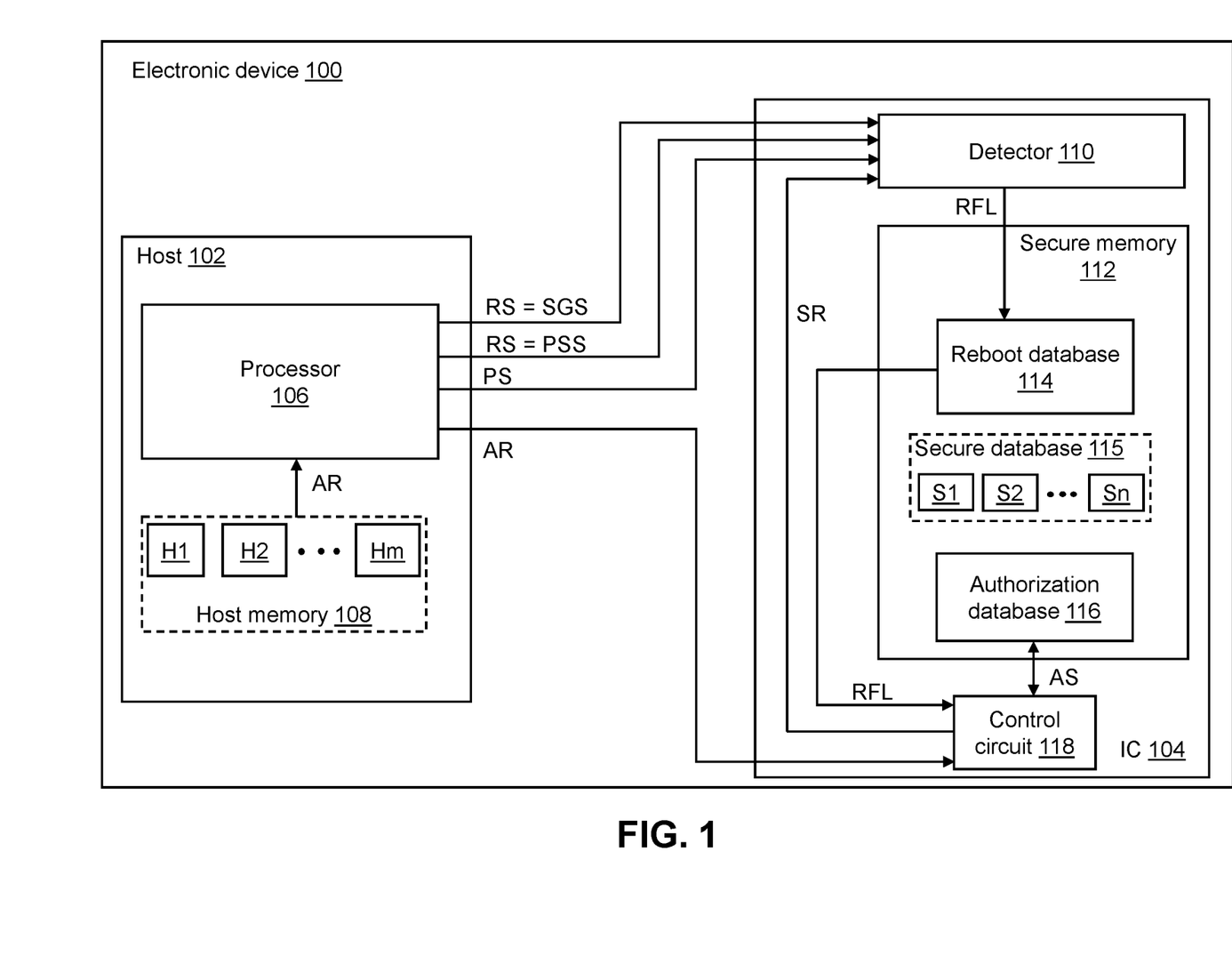
FIG. 1 is a schematic block diagram of an electronic device that includes an integrated circuit (IC), in accordance with an embodiment of the present disclosure.

FIG. 1 is a schematic block diagram of an electronic device 100, in accordance with an embodiment of the present disclosure. Examples of the electronic device 100 may include mobile phones, smart watches, personal computers, smart wearables, internet of things (IoT) devices, automotive systems, or the like. The electronic device 100 may include a host 102 and an integrated circuit (IC) 104. The IC 104 may be a secure element and is hereinafter referred to as a "secure element 104".

Host 102:

The host 102 may correspond to a main computer of the electronic device 100. The host 102 may be configured to execute a plurality of host applications H1-Hm. Examples of the plurality of host applications H1-Hm may include wallet applications, browser applications, media players, gaming applications, social media applications, content management applications, document management applications, or the like. Further, the host 102 may be configured to undergo one of (i) a normal operation and (ii) a reset operation. The normal operation of the host 102 may be indicative of the host 102 executing various functions. Examples of the various functions may include, but are not limited to, application execution, data processing, data storing, system maintenance, payment processing, or the like. The reset operation may be indicative of a reboot of the host 102 (e.g., the host 102 is turned OFF and turned back ON). Further, the reset operation may be initiated to configure a software update in the electronic device 100, update firmware of the electronic device 100, system maintenance of the electronic device 100, or the like.

The host 102 may include a processor 106 and a host memory 108. The processor 106 may include suitable logic, circuitry, and/or interfaces that may be configured to perform one or more operations. For example, the processor 106 may be configured to initiate one of (i) the normal operation of the host 102 and (ii) the reset operation of the host 102, execute the plurality of host applications H1-Hm, and initiate an authorization between the host 102 and the secure element 104 upon the reset operation of the host 102. In an embodiment, the plurality of host applications H1-Hm may be configured to generate an access request AR by way of the processor 106 to access secure functions of the IC 104 as explained in the ongoing disclosure. The access request AR may be generated in response to a user request received from external circuitry to the host 102, or generated by the host 102 pertaining to security policy, application programming interface (API) calls, external events, time-based policies, or the like. The processor 106 may be a central processing unit (CPU), a graphics processing unit (GPU), a microcontroller, an application-specific integrated circuit (ASIC), or the like.

The processor 106 may be configured to generate a reset alert signal RS such that a state of the reset alert signal RS toggles during the reset operation. For example, the reset alert signal RS may toggle from an asserted state (e.g., a logic high state) to a de-asserted state (e.g., a logic low state) to indicate the reset operation. Alternatively, the reset alert signal RS may toggle from the asserted state to the de-asserted state to indicate the reset operation. Additionally, the reset alert signal RS may include at least one of a secure general-purpose input/output (GPIO) signal SGS and a pad supply signal PSS.

Reset Alert Signal RS=Pad Supply Signal PSS

The pad supply signal PSS may be indicative of an operational state (e.g., ON state and OFF state) of the processor 106. In an embodiment, the pad supply signal PSS is asserted when the processor 106 is ON (e.g., during the normal operation of the host 102). Alternatively, when the processor 106 is turned OFF during the reset operation of the host 102, the pad supply signal PSS is de-asserted. In other words, when the host 102 undergoes the reset operation, the state of the reset alert signal (e.g., the pad supply signal PSS) toggles from the asserted state to the de-asserted state. In an embodiment, the pad supply signal PSS may be de-asserted to shut down a communication interface (not shown) between the host 102 (e.g., the processor 106) and the secure element 104. Examples of the communication interface may include serial peripheral interface (SPI), inter-integrated circuit (I2C), universal asynchronous receiver/transmitter (UART), universal serial bus (USB), or the like.

Reset Alert Signal RS=Secure GPIO Signal SGS

During the reset operation, when the processor 106 transitions from an OFF state to an ON state (e.g., turns ON), the processor 106 may be configured to execute an embedded software (not shown) stored in the host memory 108. Examples of the embedded software may include a basic input/output system (BIOS), a bootloader, a unified extensible firmware interface (UEFI) firmware, power on self-test (POST), device drivers, or the like. The processor 106 may further include a plurality of secure GPIO pins (not shown) configured to generate a secure GPIO signal SGS when the embedded software is executed. The embedded software may be designed with tamper-resistance features to prevent interference by any malicious software. In an embodiment, the processor 106 may be configured to assert the secure GPIO signal SGS via at least one of the plurality of secure GPIO pins such that the state of the secure GPIO signal SGS toggles when the processor 106 turns ON to execute the embedded software. Further, the state of the secure GPIO signal SGS may toggle such that the secure GPIO signal SGS may be de-asserted after the execution of the embedded software. In other words, during the reset operation, the processor 106 turns ON to execute the embedded software, thus, the state of the reset alert signal (e.g., the secure GPIO signal SGS) toggles from the de-asserted state to the asserted state.

The host memory 108 may be coupled to the processor 106. The host memory 108 may include suitable logic, circuitry, and/or interfaces that may be configured to perform one or more operations. For example, the host memory 108 may be configured to store the plurality of host applications H1-Hm. Examples of the host memory 108 may include hard disk drives (HDDs), solid-state drives (SSDs), external hard drives, or the like.

Secure Element 104:

The secure element 104 may be a secure hardware utilized for various applications such as secure storage, digital identification, user authentication, secure messaging, payment authentication, or the like. The secure element 104 may be coupled to the host 102. Further, the secure element 104 may be configured to receive the reset alert signal RS from the host 102 (e.g., the processor 106). The secure element 104 may be configured to determine whether the host 102 underwent a reset operation based on the state of the reset alert signal RS such that the state of the reset alert signal RS toggles during the reset operation of the host 102. Based on the determination that the host 102 underwent the reset operation, the secure element 104 may be further configured to regulate an access of the host 102 to a plurality of secure functions of the secure element 104. During a reboot of the secure element 104, firmware may be updated in the secure element 104, an irregular behavior of the secure element 104 may be corrected, or security policy changes may be implemented to the secure element 104. In an embodiment, the secure element 104 may be configured to reboot during the reset operation of the host 102. In another embodiment, the secure element 104 may reboot independently from the host 102 based on a user-requested reset or a request generated within the electronic device 100.

The secure element 104 may be further configured to receive a stable and consistent power supply PS to ensure standard operation of the secure element 104 during the reset operation. In an embodiment, the processor 106 provides the power supply PS. In another embodiment, the secure element 104 may be configured to receive the power supply PS from an external source (not shown) such that the processor 106 and the secure element 104 operate on independent power supplies. Examples of the power supply PS may include battery power supply, USB power supply, wireless power supply, or the like.

The secure element 104 may include a detector 110, a secure memory 112, and a control circuit 118.
Detector 110:

The detector 110 may be coupled to the processor 106. The detector 110 may include suitable logic, circuitry, and/or interfaces that may be configured to perform one or more operations. For example, the detector 110 may be configured to receive the reset alert signal RS from the processor 106. Based on the state of the reset alert signal RS (e.g., the reboot state), the detector 110 may be further configured to detect a reboot state of the processor 106 (e.g., the host 102) and determine whether the host 102 underwent the reset operation. In an embodiment, a state of the pad supply signal PSS may be one of (i) asserted when the host 102 remains ON, and (ii) de-asserted when the host 102 remains OFF during the reset operation. Thus, the detector 110 may detect the reboot state of the pad supply signal PSS to be de-asserted thereby determining that the host 102 underwent the reset operation. In another embodiment, the detector 110 may be configured to receive the secure GPIO signal SGS. Based on the assertion of the secure GPIO signal SGS, the detector 110 may detect the reboot state of the host 102 and determine that the host 102 underwent the reset operation. In yet another embodiment, the detector 110 may be configured to receive the pad supply signal PSS and the secure GPIO signal SGS. Based on the assertion of the secure GPIO signal SGS and the de-assertion of the pad supply signal PSS, the detector 110 may detect the reboot state of the host 102. The reboot state of the processor 106 may be detected based on the pad supply signal PSS and the secure GPIO signal SGS to further improve the reliability and fault tolerance of the detector 110.

The detector 110 may be configured to generate a reboot flag RFL based on the reboot state of the host 102. In an embodiment, a status of the reboot flag RFL may be set (e.g., set the reboot flag RFL to one) when the detector 110 determines that the host 102 underwent the reset operation based on the detected reboot state. The secure memory 112 may be configured to store the reboot flag RFL. The detector 110 may generate the reboot flag RFL based on at least one of the de-assertion of the pad supply signal PSS and the assertion of the secure GPIO signal SGS.

The detector 110 may be further configured to transition from a low power mode to a normal mode when the state of the reset alert signal RS toggles (e.g., the reset alert signal RS may switch from an asserted state to a de-asserted state to indicate the reset operation). During the normal mode, the detector 110 may generate the reboot flag RFL indicative of the reboot state of the host 102. The detector 110 may be configured to actively monitor and detect the reset alert signal RS.

During the low power mode, the detector 110 may be further configured to operate in a low energy consumption state such that the efficiency of the detector 110 is improved and a battery life associated with the electronic device 100 may be extended. In an embodiment, the detector 110 may be configured to operate with reduced power and processing capability in the low energy consumption state such that the reset alert signal RS may be monitored at a reduced frequency. In another embodiment, the secure element 104 may include an interrupt circuit (not shown) that may be coupled to the processor 106. Additionally, the detector 110 may be configured to remain in a sleep state during the low power mode. Further, the interrupt circuit may be configured to receive the reset alert signal RS and generate an interrupt signal (not shown) when the state of the reset alert signal RS toggles. The interrupt circuit may be further configured to transmit the interrupt signal to the detector 110. Upon receiving the interrupt signal, the detector 110 may be further configured to transition from the low power mode to the normal mode.
Secure Memory 112:

The secure memory 112 may be coupled to the detector 110. The secure memory 112 may include a reboot database 114, a secure database 115, and an authorization database 116. The secure memory 112 may include suitable logic, circuitry, and/or interfaces that may be configured to perform one or more operations. For example, when the secure element 104 reboots, the secure memory 112 may retain data (e.g., the reboot flag RFL associated with each of the plurality of host applications H1-Hm) persistently to ensure data integrity. The secure memory 112 may be a non-volatile memory or a storage-class memory. Examples of the secure memory 112 may include flash memory, solid-state drives (SSD), non-volatile random-access memory (NVRAM), magnetoresistive random-access memory (MRAM), phase change memory (PCM), battery-backed static random-access memory (SRAM), resistive random-access memory (ReRAM), or the like.

The secure memory 112 may store the reboot flag RFL (shown later in FIGS. 2A-2B) associated with each of the plurality of host applications H1-Hm in the reboot database 114 as each of the plurality of secure functions associated with at least one of the plurality of secure applications S1-Sn may be invoked at different time instances. Examples of the reboot database 114 may include relational database, extensible markup language (XML) database, in-memory database, blockchain database, or the like.

The secure memory 112 may be further configured to store a plurality of secure applications S1-Sn in the secure database 115. In one embodiment, installation of the plurality of secure applications S1-Sn in the secure memory 112 may be initiated by the processor 106. Examples of the secure database 115 may include library database, software repository, application library, or the like. Examples of the plurality of secure applications S1-Sn may include authentication applications, payment applications, password managing applications, IoT applications, or the like. The plurality of secure applications S1-Sn may be associated with at least one of the plurality of secure functions. In an example, a first secure application S1 may be associated with one or more of the plurality of secure functions. The plurality of secure functions may be related to specific tasks or operations executed on the secure element 104. Examples of the plurality of secure functions may include device authorization, payment processing, identity verification, secure messaging, cryptographic operation, access control, digital signature, tokenization, or the like.

The secure memory 112 may be further configured to store a plurality of general applications (not shown) in the secure database 115. Examples of the plurality of general-purpose applications may include messaging applications, device management applications, cloud storage applications, health and fitness applications, or the like. The plurality of general-purpose applications may be associated with at least one of a plurality of general-purpose functions. In an example, a first general application may be associated with one or more of the plurality of general-purpose functions. The plurality of secure functions may be related to specific tasks or operations executed on the secure element 104 and may be unrelated to the sensitive data. In an embodiment, the plurality of general applications may be stored outside the secure memory 112. Examples of the plurality of general-purpose functions may include device information, error logging, device updates, power management, timekeeping, or the like.

Each of the plurality of secure applications S1-Sn may be linked with at least one of the plurality of host applications H1-Hm. In a scenario, the first host application H1 is a wallet application stored in the host memory 108. Thus, the secure memory 112 may include a first plurality of secure applications that may be linked to the wallet application. Additionally, a plurality of secure functions may be associated with the first plurality of secure applications. In an example, when a credit card payment is initiated in the wallet application (e.g., the first host application H1), the secure function (e.g., a first secure function) associated with at least one of the first plurality of secure applications may be accessed via the processor 106 to complete the payment. Alternatively, when a debit card payment is initiated in the wallet application (e.g., the first host application H1), the secure function (e.g., a second secure function) associated with at least one of the first plurality of secure applications may be accessed via the processor 106 to successfully complete the payment.

The secure memory 112 may be further configured to persistently store an authorization state AS (shown later in FIGS. 2A-2B) associated with each of the plurality of host applications H1-Hm in the authorization database 116. The authorization state AS may be indicative of the authorization between the control circuit 118 and the processor 106.

Control Circuit 118:

The control circuit 118 may be coupled to the processor 106. The control circuit 118 may be further coupled to the detector 110 and the secure memory 112. The processor 106 may be configured to transmit the access request AR to the control circuit 118. The control circuit 118 may include suitable logic, circuitry, and/or interfaces that may be configured to perform one or more operations. For example, the control circuit 118 may be configured to receive the access request AR from the processor 106. The control circuit 118 may be further configured to generate a status request SR based on the received access request AR. The status request SR may be generated in response to the access request AR received from the processor 106. In an embodiment, the status request SR may be indicative of a request to receive the reboot flag RFL associated with at least one of the plurality of host applications H1-Hm. Further, the control circuit 118 may be configured to transmit the status request SR to the detector 110. Based on the status request SR, the secure memory 112 may be further configured to provide the reboot flag RFL associated with at least one of the plurality of host applications H1-Hm to the control circuit 118. The reboot flag RFL associated with at least one of the plurality of host applications H1-Hm may be reset by the secure memory 112 when the associated reboot flag RFL is retrieved by the control circuit 118.

In another embodiment, the control circuit 118 may receive the access request AR from at least one of the plurality of host applications H1-Hm to access at least one of the plurality of secure functions during the reset operation of the host 102. The control circuit 118 may thus generate the status request SR based on the received access request AR and transmit the status request SR to the detector 110. Upon receiving the status request SR, the detector 110 may detect the reboot state of the host 102 when the state of the reset alert signal RS toggles. Further, the detector 110 may be configured to provide the reboot flag RFL to the control circuit 118 when the reboot state indicates that the host 102 underwent the reset operation. The control circuit 118 may thus determine the status of the reboot flag RFL based on the reception of the access request AR.

The control circuit 118 may determine the authorization state AS of the host 102 (e.g., each of the plurality of the host applications H1-Hm) and store the authorization state AS in the authorization database 116. Examples of the control circuit 118 may include a microprocessor, a control logic, a central processing unit (CPU), or the like. In an embodiment, the authorization state AS may be associated with the authorization between the control circuit 118 and the processor 106 (e.g., the host 102). In one embodiment, the host 102 may be configured to initiate the authorization after the reset operation is completed and upon generation of the access request AR. In another embodiment, the host 102 may be configured to initiate the authorization during the reset operation. Examples of the authorization may be at least one of a group consisting of trusted binding, multi-factor authorization, token-based authorization, certificate-based authorization, blockchain-based authorization, behavioral-based authorization, or the like. The authorization state AS may be one of (i) a first state indicative of absence of the authorization or failure of the authorization between the control circuit 118 and the processor 106 after the reset operation, and (ii) a second state indicative of a successful authorization between the control circuit 118 and the processor 106 after the reset operation.

The control circuit 118 may be further configured to regulate access of the host 102 (e.g., at least one of the plurality of host applications H1-Hm) to at least one of the plurality of secure functions based on the status of the reboot flag RFL and the authorization state AS.

Restricting Access after Reset Operation:

In one scenario, the host 102 initiates the authorization, and the authorization state AS is indicative of a successful authorization. A reset operation of the host 102 occurs thereafter. At least one of the plurality of host applications H1-Hm generates the access request AR after the reset operation. The control circuit 118 may thus determine the status of the reboot flag RFL based on the reception of the access request AR. The status of the reboot flag RFL may indicate the reset operation of the host 102 as the reboot flag RFL is set (e.g., the reboot flag RFL is set to one).

The control circuit 118 may determine that the authorization state AS indicates the successful authorization between the control circuit 118 and the processor 106 (e.g., the host 102) before an occurrence of the reset operation of the host 102 and the status of the reboot flag RFL is indicative of the reset operation of the host 102. Thus, the control circuit 118 may determine absence of the authorization between the control circuit 118 and the processor 106 (e.g., the host 102) after the occurrence of the reset operation of the host 102. The control circuit 118 may thus update the authorization state AS to the first state such that the first state indicates the absence of the authorization after the reset operation of the host 102. Further, the control circuit 118 may restrict access of at least one of the plurality of host applications H1-Hm to at least one of the plurality of secure functions to prevent any unauthorized access. In an embodiment, the control circuit 118 may be further configured to transmit a lockout signal (not shown) to the processor 106 such that based on the lockout signal the processor 106 may detect that the access to the plurality of secure functions is restricted. In an embodiment, the authorization state AS may include a first time stamp (not shown). The first time stamp may indicate a time of the authorization between the control circuit 118 and the processor 106. Additionally, the reboot flag RFL may include a second time stamp (not shown). The second time stamp may indicate the time of the reset operation of the host 102. Further, based on the first time stamp and the second time stamp, the control circuit 118 may be configured to determine the time of authorization. In an example, when the first time stamp of the authorization state AS is earlier than the second time stamp of reception of the reboot flag RFL, the control circuit 118 may determine that the authorization state AS corresponds to an authorization between the host 102 and the control circuit 118 before the occurrence of the reset operation in the aforementioned scenario. Thus, the authorization state AS may be indicative of a successful authorization between the control circuit 118 and the processor 106 before the reset operation. Further, the control circuit 118 may update the authorization state AS to the first state and restricts the host 102 from accessing the plurality of secure functions.

Granting Access after Restricting Access Upon Reset Operation:

When the control circuit 118 restricts access of at least one of the plurality of host applications H1-Hm to at least one of the plurality of secure functions, the host 102 may be further configured to initiate the authorization with the control circuit 118. Further, when the authorization between the control circuit 118 and the processor 106 is successful after the reset operation of the host 102, the control circuit 118 circuit may be further configured to update the authorization state AS to the second state. Further, based on the authorization state AS being at the second state, the control circuit 118 may be further configured to grant at least one of the plurality of host applications H1-Hm access to the plurality of secure functions and the plurality of general-purpose functions. In the above example, upon successful authorization, an updated time of the first time stamp is later than the time of the second time stamp. Further, the authorization state AS is updated to the second state. Thus, the control circuit 118 grants the host 102 access to the plurality of secure functions.

Restricting Access after Failure of Authorization Upon Reset Operation:

In another scenario, the authorization between the host 102 and the control circuit 118 after the reset operation is a failure. The authorization may fail due to incorrect credentials, communication protocol mismatch, clock synchronization issue, memory corruption, or the like. Thus, the control circuit 118 may determine the failure of the authorization between the control circuit 118 and the processor 106 after the occurrence of the reset operation of the host 102. The control circuit 118 may thus update the authorization state AS to the first state such that the first state indicates the failure of the authorization after the reset operation of the host 102. Further, the control circuit 118 may restrict access of at least one of the plurality of host applications H1-Hm to at least one of the plurality of secure functions to prevent any unauthorized access. Additional troubleshooting steps may be required when the authorization between the control circuit 118 and the processor 106 is a failure. Examples of the additional troubleshooting steps may include, software updates, factory reset, service center repairs, or the like. Alternatively, the processor 106 may re-initiate an authorization once the authorization fails.

In yet another scenario, when the status of the reboot flag RFL is indicative of the normal operation of the host 102 (e.g., the status of the reboot flag RFL is reset), the control circuit 118 may be further configured to maintain the authorization state AS based on the authorization. In an example, when the authorization is successful, the authorization state AS is updated to the second state. In another example, when the authorization has failed, the authorization state AS is updated to the first state. Further, the control circuit 118 may regulate the access of the plurality of host applications H1-Hm to at least one of the plurality of secure functions and the plurality of general-purpose functions based on the authorization state AS.

In Operation:

The processor 106 may initiate the installation of one of the plurality of secure applications S1-Sn, such as the first secure application S1, in the secure memory 112. The first secure application S1 may be an applet of at least one of the plurality of host applications H1-Hm. For example, when the first host application H1 is a wallet application stored in the host memory 108, a first plurality of applets may be linked to the wallet application such that when a payment is initiated in the wallet application, at least one of the first plurality of applets may be accessed via the processor 106 to complete the payment. In an embodiment, the first secure application S1 may include cryptographic credentials (e.g., digital signatures, digital certificates, or the like). The cryptographic credentials may be used to ensure the authenticity and integrity of the first secure application S1. The processor 106 may be further configured to establish a secure channel (not shown) with the detector 110. The secure channel may be established to protect the cryptographic credentials. The detector 110 may be configured to authorize the installation of the first secure application S1 by verifying the digital signature or the digital certificate. The control circuit 118 may install the first secure application S1 in the secure memory 112.

The control circuit 118 may be configured to determine the status of the reboot flag RFL associated with at least one of the plurality of host applications H1-Hm stored in the host memory 108 of the host 102 based on the installation of the first secure application S1. The control circuit 118 may be further configured to determine the successful installation of the first secure application S1. Further, the control circuit 118 may be configured to transmit a confirmation signal (not shown) to the processor 106. Based on the confirmation signal, the processor 106 may be notified about the successful installation of the first secure application S1.

The host 102 may undergo the reset operation. The detector 110 may receive the reset alert signal RS (e.g., the pad supply signal PSS or the secure GPIO signal SGS) from the processor 106. Further, the detector 110 may detect the reboot state of the processor 106 when the state of the reset alert signal RS toggles and determine that the host 102 underwent the reset operation. Further, the detector 110 may set the reboot flag RFL that indicates the reboot state of the processor 106 and store the reboot flag RFL in the secure memory 112.

At least one of the plurality of host applications H1-Hm may generate the access request AR by way of the processor 106 to access at least one of the plurality of secure functions associated with the first secure application S1. The processor 106 may transmit the access request AR to the control circuit 118. The control circuit 118 may generate the status request SR based on the received access request AR. Further, the control circuit 118 may transmit the status request SR to the detector 110.

The secure memory 112 may provide the authorization state AS from the secure memory 112 based on the status request SR. Further, the control circuit 118 may determine that the authorization state AS is indicative of an authorization before the reset operation and the authorization state AS of each of the plurality of the host applications H1-Hm is indicative of the successful authorization before the reset operation. The secure memory 112 may provide the reboot flag RFL associated with at least one of the plurality of host applications H1-Hm to the control circuit 118 based on the status request SR. Based on the reboot flag RFL, the control circuit 118 may determine that the processor 106 underwent the reset operation. Additionally, the reboot flag RFL associated with at least one of the plurality of host applications H1-Hm may be reset by the secure memory 112 once retrieved by the control circuit 118.

The control circuit 118 may update the authorization state AS associated with at least one of the plurality of host applications H1-Hm to the first state to indicate the absence of the authorization after the host 102 underwent the reset operation. Further, the control circuit 118 may restrict the access of at least one of the plurality of host applications H1-Hm to at least one of the plurality of secure functions associated with the first secure application S1. The processor 106 may initiate the authorization with the control circuit 118. When the authorization between the control circuit 118 and the processor 106 is successful, the control circuit 118 circuit may update the authorization state AS to the second state. Further based on the authorization state AS being at the second state, the control circuit 118 may grant at least one of the plurality of host applications H1-Hm access to the plurality of secure functions and the plurality of general-purpose functions. When the authorization between the control circuit 118 and the processor 106 is a failure, the control circuit 118 circuit may update the authorization state AS to the first state. Further based on the authorization state AS being at the first state, the control circuit 118 may restrict access to the plurality of host applications H1-Hm to the plurality of secure functions.

Figure 2A:
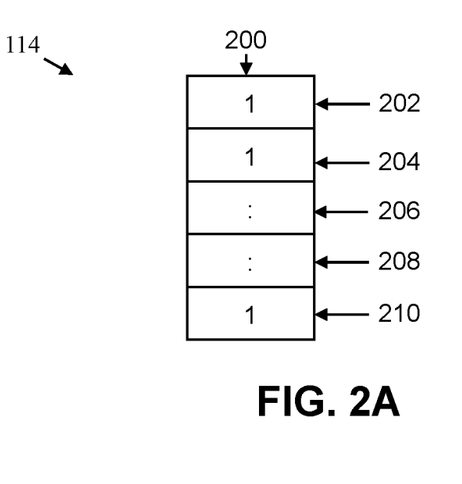
FIGS. 2A-2B illustrate a reboot database stored in a secure memory of the IC of FIG. 1, in accordance with an embodiment of the present disclosure.
Figure 2B:
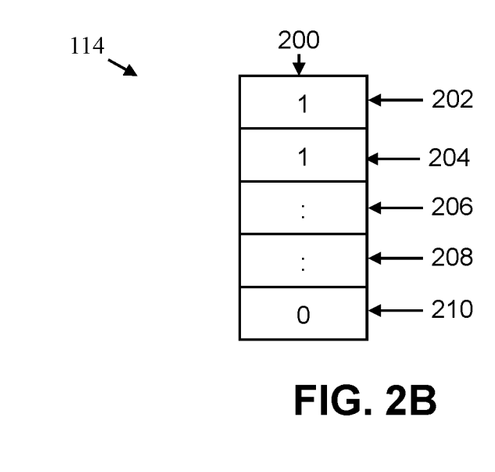

FIGS. 2A-2B illustrate the reboot database 114 stored in the secure memory 112, in accordance with an embodiment of the present disclosure.

Referring now to FIG. 2A, the reboot database 114 includes a column 200. The column 200 may correspond to a plurality of reference addresses 202-210 of the reboot database 114. Each of the plurality of reference addresses 202-210 may be associated with a storage of the reboot flag RFL corresponding to a host application of the plurality of host applications H1-Hm. The plurality of host applications may include a first host application H1, a second host application H2, . . . , and an Mth host application Hm. In an example, a first reference address 202 of the plurality of reference addresses 202-210 may store the reboot flag RFL (e.g., the reboot flag RFL is set to '1') associated with the first host application H1 before the generation of the access request AR corresponding to the first host application H1. Similarly, the reboot flag RFL of each of the second host application H2 and the Mth host application Hm may be set to '1'. Examples of the reboot database 114 may include relational database, extensible markup language (XML) database, in-memory database, blockchain database, or the like.

Referring now to FIG. 2B, the column 200 corresponds to the reboot flag RFL indicating the reboot state of the processor 106. In an exemplary embodiment, the Mth host application Hm may be configured to generate the access request AR to access at least one of the plurality of secure applications S1-Sn stored in the secure memory 112. Further, the processor 106 may transmit the access request AR to the control circuit 118. The control circuit 118 may receive the access request AR from the processor 106. The control circuit 118 may generate the status request SR based on the received access request AR. Further, the control circuit 118 may be configured to transmit the status request SR to the detector 110. Based on the status request SR, the secure memory 112 may provide the reboot flag RFL associated with the Mth host application Hm. Additionally, the reboot flag RFL associated with the Mth host application Hm may be reset by the secure memory 112 once retrieved by the control circuit 118 (e.g., the reboot flag RFL is set to "0"). Further, the reboot flag RFL associated with each of the second host application H2 and the first host application H1 continues to remain at '1'.

Although FIG. 2B describes the Mth host application Hm generates the access request AR to access at least one of the plurality of secure applications S1-Sn stored in the secure memory 112, the scope of the present disclosure is not limited to it. In various other embodiments, different or multiple host applications may generate the access request AR to access at least one of the plurality of secure applications S1-Sn stored in the secure memory 112, without deviating from the scope of the present disclosure.

Figure 3:
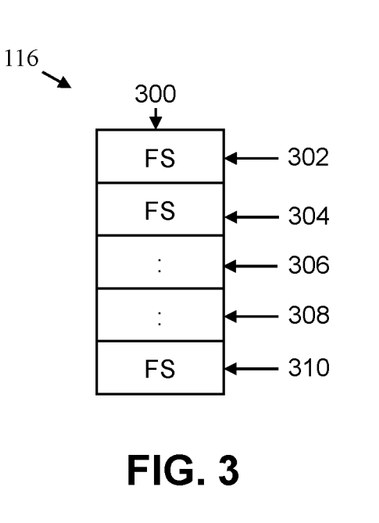
FIG. 3 illustrates an authorization database stored in a secure memory of the IC of FIG. 1, in accordance with an embodiment of the present disclosure.

FIG. 3 illustrates the authorization database 116 stored in the secure memory 112, in accordance with an embodiment of the present disclosure.

The authorization database 116 includes a column 300. The column 300 may correspond to a plurality of reference addresses 302-310 of the authorization database 116. Each of the plurality of reference addresses 302-310 may be associated with a storage of the authorization state AS corresponding to a host application of the plurality of host applications H1-Hm. In an example, a first reference address 302 of the plurality of reference addresses 302-310 may store the authorization state AS as the first state (e.g., the authorization state AS is set to 'FS') associated with the first host application H1 before the generation of the access request AR corresponding to the first host application H1. Similarly, the authorization state AS of each of the second host application H2 and the Mth host application Hm may be set to the first state. Examples of the authorization database 116 may include relational database, extensible markup language (XML) database, in-memory database, blockchain database, or the like. In another embodiment, the first reference address 302 may store the authorization state AS as the first state (e.g., the authorization state AS is set to 'FS') associated with the first host application H1 and the second host application H2 before the generation of the access request AR corresponding to at least one of the first host application H1 and the second host application H2. Similarly, the authorization state AS of the Mth host application Hm may be set to the first state.

Figure 4:
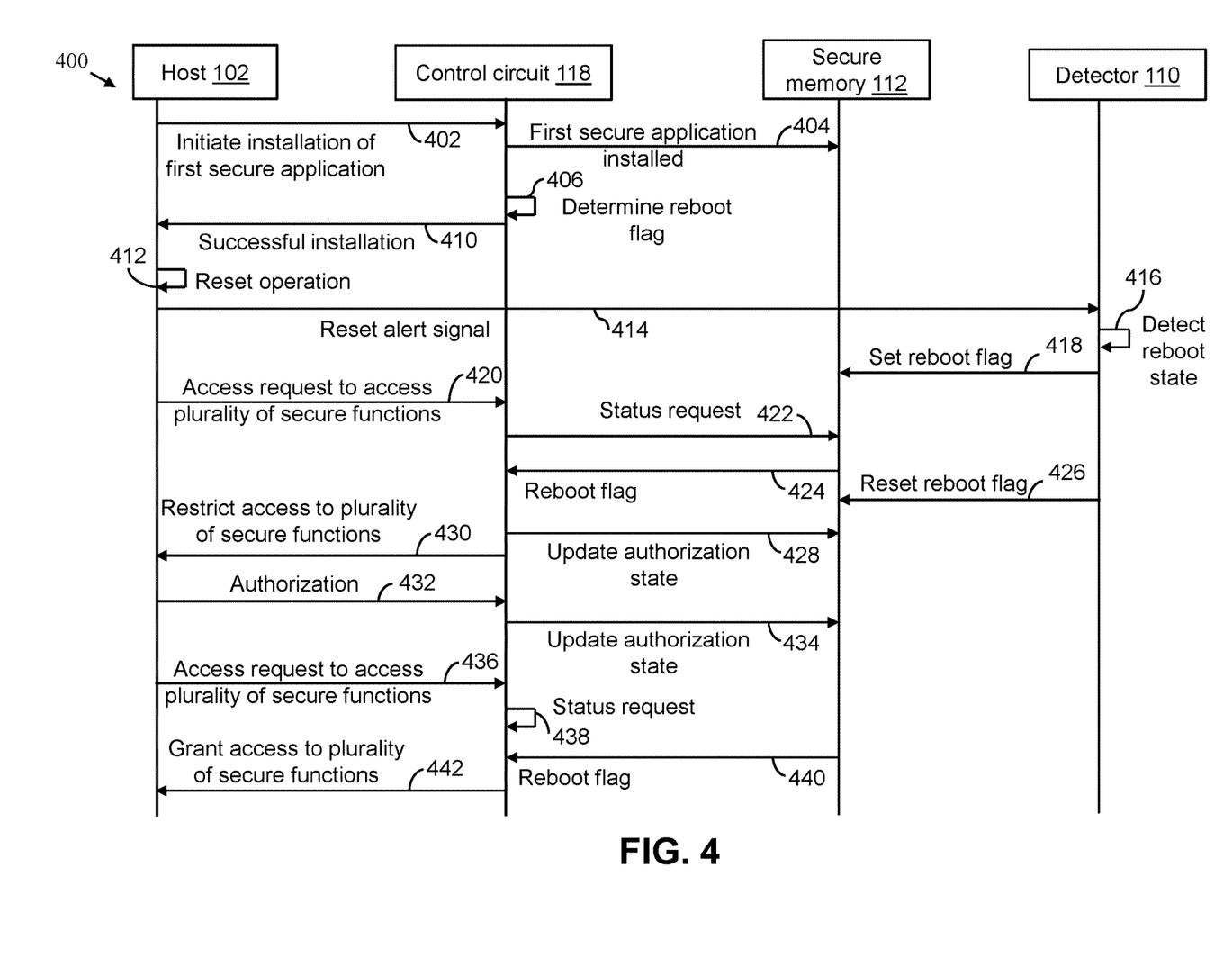
FIG. 4 represents a process flow diagram that illustrates access regulation of a host of FIG. 1 to a plurality of secure functions of the IC of FIG. 1, in accordance with an embodiment of the present disclosure.

FIG. 4 represents a process flow diagram 400 that illustrates the access regulation of the host 102 to the plurality of secure functions, in accordance with an embodiment of the present disclosure. For the sake of brevity and without deviating from the scope of disclosure, it is assumed that the host 102 generates the access request to access the first secure application S1.

The installation of the first secure application S1 is initiated by the processor 106 of the host 102 (as shown by arrow 402). The first secure application is installed in the secure memory 112 by the control circuit 118 (as shown by arrow 404). The control circuit 118 may determine the status of the reboot flag RFL associated with at least one of the plurality of host applications H1-Hm stored in the host memory 108 of the host 102 (as shown by arrow 406). Based on the successful installation of the first secure application S1, the control circuit 118 may transmit the confirmation signal to the host 102 indicative of the successful installation of the first secure application (as shown by arrow 410).

The processor 106 may execute the reset operation of the host 102 (as shown by arrow 412). During the reset operation, the processor 106 may toggle the state of the reset alert signal RS and transmit the reset alert signal RS to the detector 110 (as shown by arrow 414). Further, the detector 110 may detect the reboot state of the host 102 when the state of the reset alert signal RS toggles (as shown by arrow 416). In an embodiment, the detector 110 may set the reboot flag RFL (e.g., set the reboot flag RFL to one) when the reboot state is indicative of the reset operation (as shown by arrow 418).

At least one of the plurality of host applications H1-Hm stored in the host memory 108 may generate the access request AR to access at least one of the plurality of secure functions associated with the first secure application S1 stored in the secure memory 112. The host 102 may transmit the access request AR to the control circuit 118 (as shown by arrow 420). The status request SR to determine the reboot flag RFL associated with at least one of the plurality of host applications H1-Hm is generated by the control circuit 118 (as shown by arrow 422). Based on the status request SR, the reboot flag RFL indicative of the reset operation is received by the control circuit 118 (as shown by arrow 424). The detector 110 may reset the reboot flag RFL (e.g., the reboot flag RFL='0') when the control circuit 118 receives the reboot flag RFL (as shown by arrow 426). The authorization state AS associated with at least one of the plurality of host applications H1-Hm is updated to the first state based on the status of the reboot flag RFL that indicates the reset operation (as shown by arrow 428). The control circuit 118 may restrict the access of at least one of the plurality of host applications H1-Hm to the plurality of secure functions (as shown by arrow 430). The authorization between host 102 and the control circuit 118 is initiated by the processor 106 after the reset operation (as shown by arrow 432). For the sake of brevity and without deviating from the scope of the disclosure, it is assumed that the authorization is successful. Further, the host 102 may transmit the access request AR to the control circuit 118 after the authorization between the host 102 and the control circuit 118. Based on the successful authorization between the host 102 and the control circuit 118, the authorization state AS may be updated from the first state to the second state (as shown by arrow 434). The control circuit 118 may grant the host 102 access to the plurality of secure functions (as shown by arrow 436). The status request SR to determine the reboot flag RFL associated with at least one of the plurality of host applications H1-Hm may be generated by the control circuit 118 (as shown by arrow 438). Based on the status request SR, the reboot flag RFL indicative of the normal operation of the host 102 may be received by the control circuit 118 (as shown by arrow 440). The control circuit 118 may grant the access of at least one of the plurality of host applications H1-Hm to the plurality of secure functions (as shown by arrow 442).

Figure 5A:
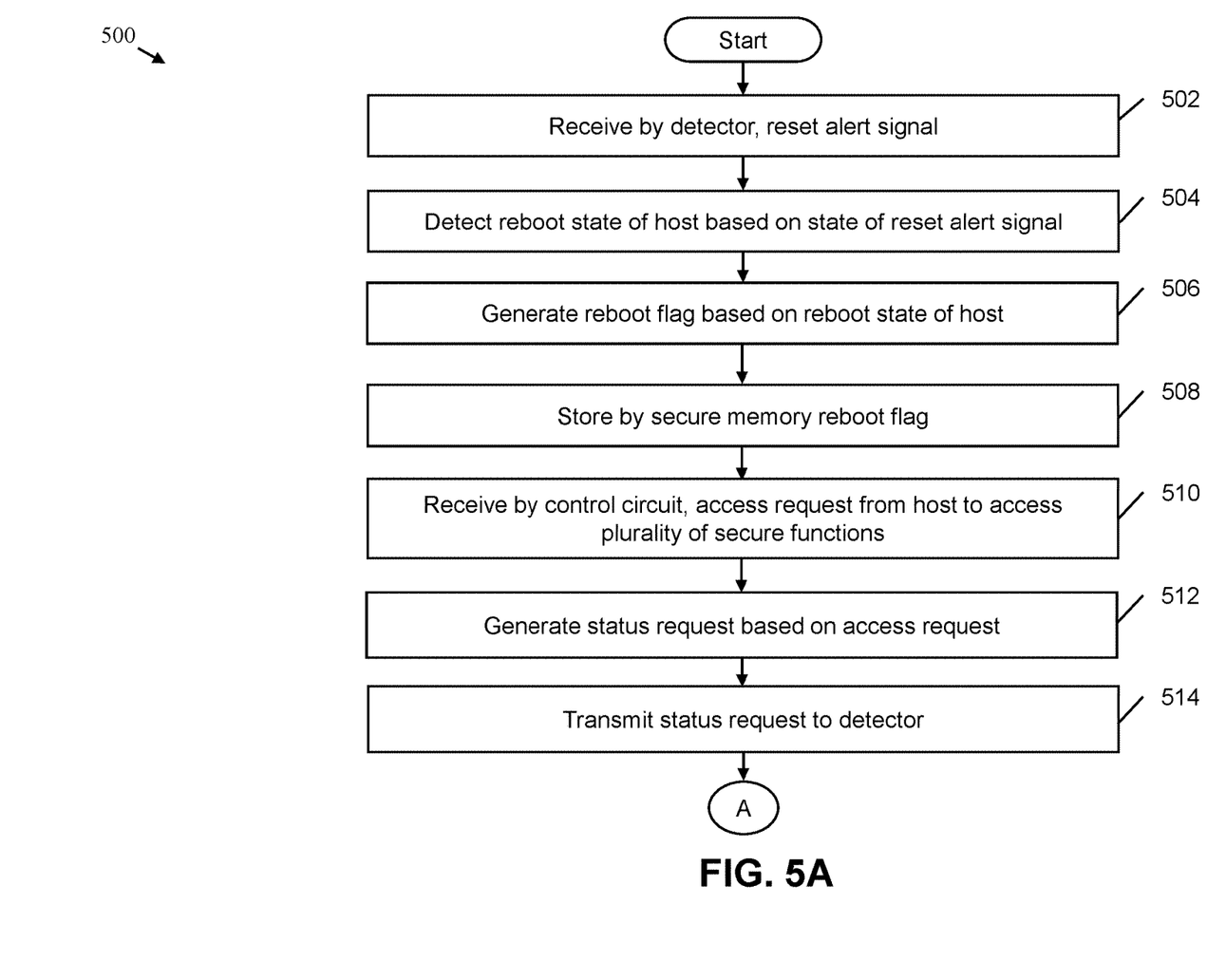
FIGS. 5A-5C, collectively, represents a flowchart that illustrates an access regulation method for regulating access to secure functions of the IC of FIG. 1, in accordance with an embodiment of the present disclosure.
Figure 5B:
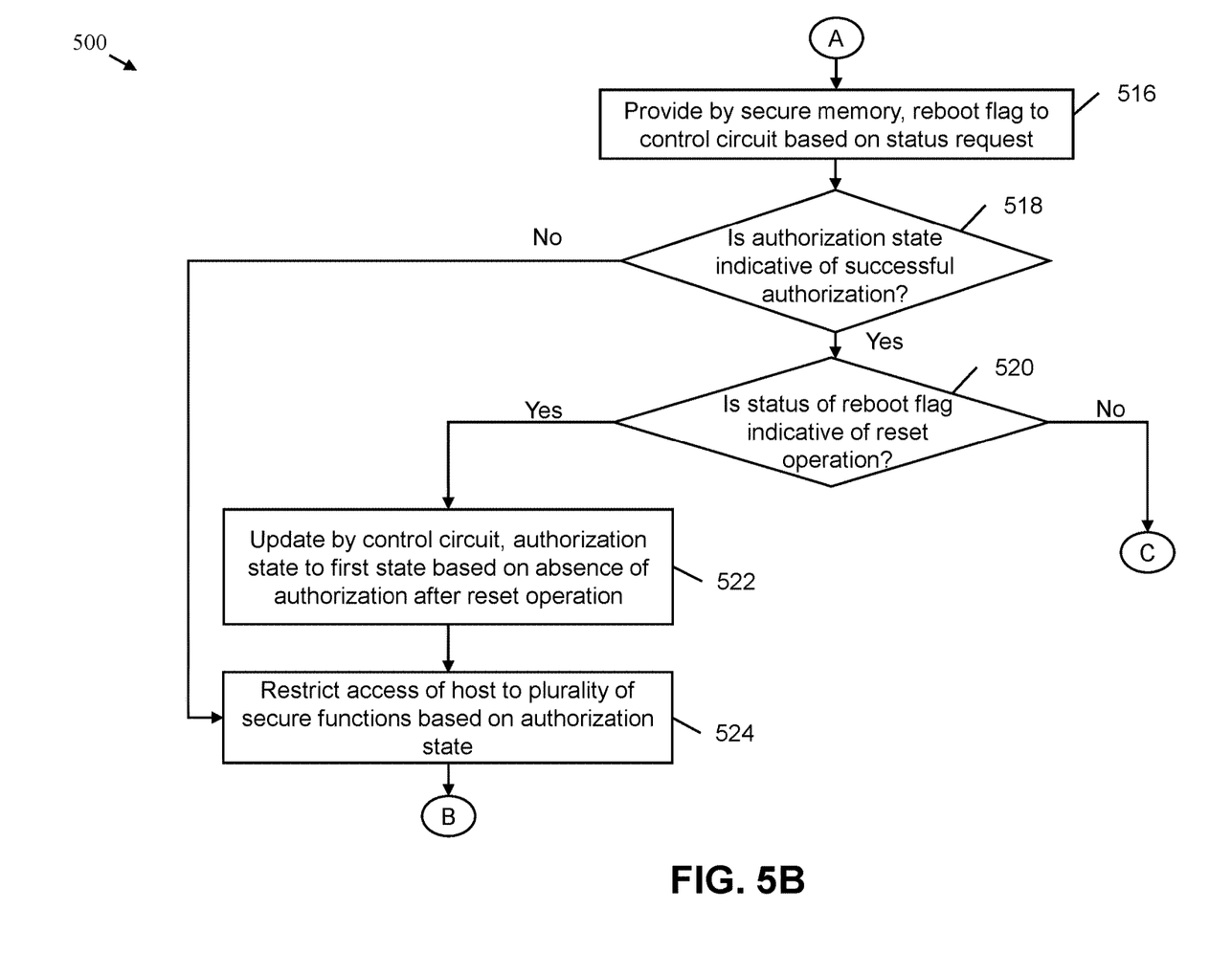
Figure 5C:
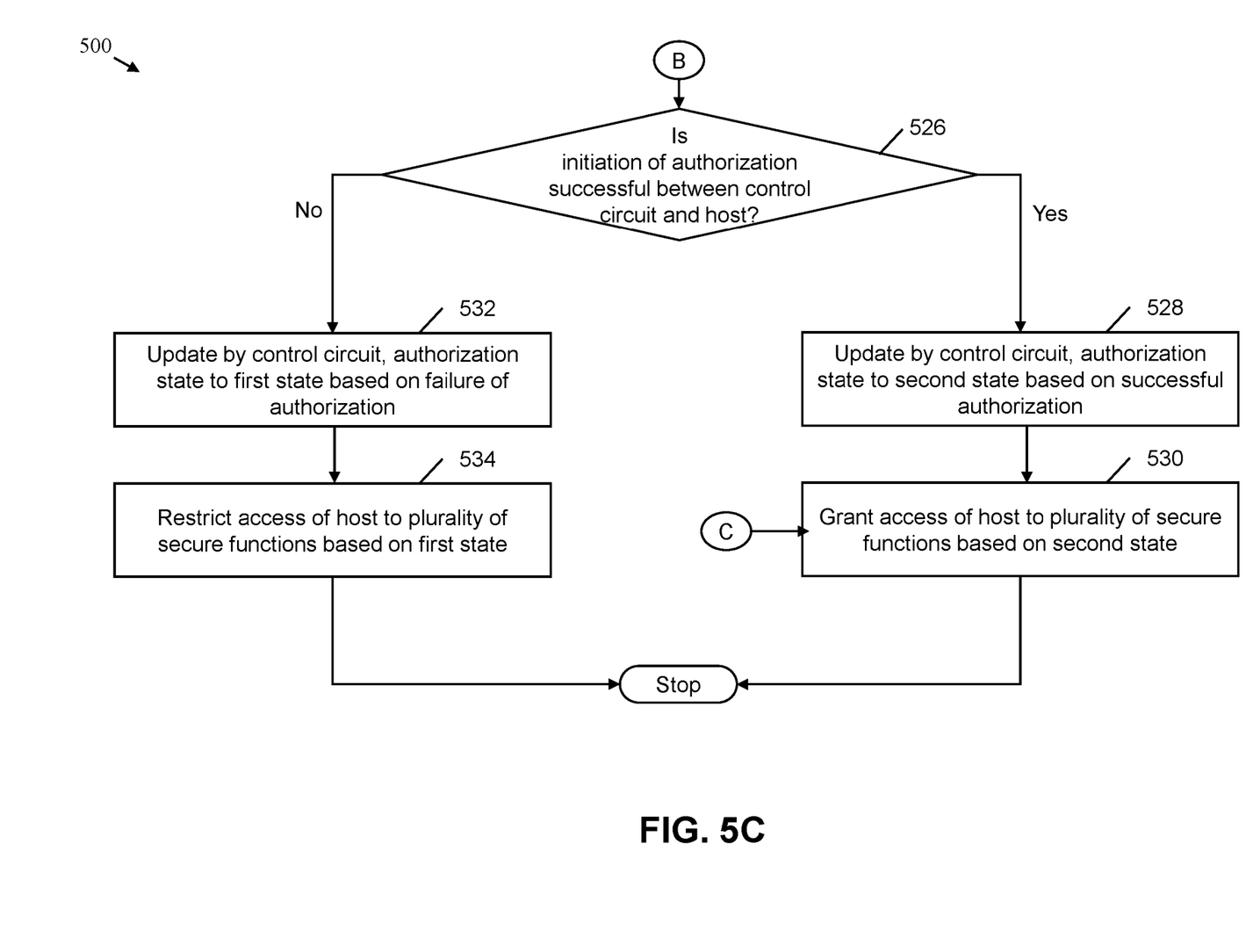

FIGS. 5A-5C, collectively, represents a flowchart 500 that illustrates an access regulating method for regulating access to secure functions, in accordance with an embodiment of the present disclosure.

Referring now to FIG. 5A, at step 502, the detector 110 may receive the reset alert signal RS transmitted by the host 102 (e.g., the processor 106). The reset alert signal RS may include at least one of the secure GPIO signal SGS and the pad supply signal PSS. At step 504, the detector 110 may detect the reboot state of the host 102 when the state of the reset alert signal RS toggles. At step 506, the detector 110 may generate the reboot flag RFL (e.g., set the reboot flag RFL or reset the reboot flag RFL) based on the reboot state of the host 102. For example, the detector 110 may set the reboot flag RFL as one when the reboot state is indicative of the reset operation. At step 508, the secure memory 112 may store the reboot flag RFL associated with each of the plurality of host applications H1-Hm stored in the host 102 (e.g., the host memory 108). The secure memory 112 may store the reboot flag RFL in the reboot database 114. At step 510, the control circuit 118 may receive the access request AR from the host 102 to access at least one of the plurality of secure functions associated with the plurality of secure applications S1-Sn stored in the secure memory 112. At step 512, the control circuit 118 may generate the status request SR based on the received access request AR. At step 514, the control circuit 118 may transmit the status request SR to the detector 110.

Referring now to FIG. 5B, at step 516, the secure memory 112 may provide the reboot flag RFL to the control circuit 118 based on the access request AR transmitted to the detector 110. At step 518, it is determined whether the authorization state AS is indicative of the successful authorization between the host 102 and the control circuit 118. If at step 518, it is determined that the authorization state AS is indicative of the successful authorization (e.g., before the reset operation), step 520 is performed. At step 520, it is determined whether the status of the reboot flag RFL is indicative of the reset operation. If at step 520, it is determined that the status of the reboot flag RFL is indicative of the reset operation, step 522 is performed. At step 522, the control circuit 118 may update the authorization state AS to the first state such that the first state may indicate the absence of the authorization. If at step 518, it is determined that the authorization state AS is not indicative of the successful authorization (e.g., before the reset operation), step 524 is performed.

At step 524, the control circuit 118 may restrict the access to the plurality of secure functions based on the authorization state AS. The control circuit 118 may grant the access to the plurality of general-purpose functions. Further, the host 102 may initiate the authorization after the reset operation of the host 102.

Referring now to FIG. 5C, at step 526, it is determined whether the initiation of the authorization between the control circuit 118 and the host 102 is successful. If at step 526, it is determined that the authorization between the control circuit 118 and the host 102 is successful after the reset operation, step 528 is performed. At step 528, the control circuit 118 may update the authorization state AS to the second state such that the second state may indicate the successful authorization between the control circuit 118 and the host 102 after the reset operation of the host 102. If at step 520, it is determined that the status of the reboot flag RFL is not indicative of the reset operation, step 530 is performed. At step 530, the control circuit 118 may grant the host 102 access to the plurality of secure functions and the plurality of general-purpose functions. If at step 526, it is determined that the authorization between the control circuit 118 and the host 102 has failed after the reset operation, step 532 is performed. At step 532, the control circuit 118 may update the authorization state AS to the first state such that the first state may indicate the failure of the authorization. At step 534, the control circuit 118 may restrict the access to the plurality of secure functions.

The authorization database 116 may store the authorization state AS persistently in the secure memory 112. Further, the detector 110 and the control circuit 118 add an extra security layer to the electronic device 100. The detector 110 may detect the reboot state of the host 102 based on the state of the reset alert signal RS. In the event of an attack by a malicious software that gains control of the host 102, the control circuit 118 restricts access to such software based on the determination of failure or absence of the authorization after the reset operation of the host 102. On initiation of the authorization, a failure of the authorization may occur due to the control of the host 102 by the malicious software. Thus, the malicious software is unable to access secure functions of the electronic device 100 and a safety of the electronic device 100 is improved. When genuine applications of the host 102 may generate the access request AR by way of the processor 106 to access the plurality of secure applications S1-Sn, the authorization between the control circuit 118 and the host 102 serves as a deterministic factor to grant access to the host 102 to the plurality of secure applications S1-Sn after the reset operation of the host 102. When the authorization between the host 102 and the control circuit 118 after the reset operation of the host 102 is successful, the control circuit 118 may grant access to the plurality of secure functions to at least one of the plurality of host applications H1-Hm. Similarly, the authorization may occur for remote IoT devices that may control secure operations remotely to ensure the security of the underlying secure operations.

In an embodiment, an integrated circuit (IC) may comprise a detector coupled to a host, wherein the detector may be configured to receive a reset alert signal from the host. Further, the detector may be configured to detect a reboot state of the host based on a state of the reset alert signal, wherein the state of the reset alert signal toggles during a reset operation of the host. The detector may be further configured to generate a reboot flag based on the reboot state of the host. A control circuit of the IC may be coupled to the detector and the host, wherein the control circuit may be configured to receive an access request from the host to access a plurality of secure functions of the IC. The control circuit may be further configured to determine upon receiving the access request, a status of the reboot flag and an authorization state of the host. Further, the control circuit may be configured to regulate based on the status of the reboot flag and the authorization state, access of the host to the plurality of secure functions.

In some embodiments, the IC may further comprise a secure memory coupled to the detector and the control circuit, wherein the secure memory may be configured to store the reboot flag. The secure memory may be further configured to provide based on the access request, the reboot flag to the control circuit.

In some embodiments, the control circuit may be further configured to generate based on the access request received from the host, a status request. Further, the control circuit may be configured to transmit the status request to the detector, wherein the control circuit may receive the reboot flag from the secure memory based on the transmission of the status request to the detector.

In some embodiments, when the control circuit may determine that the authorization state is associated with a successful authorization between the control circuit and the host before the reset operation of the host and the status of the reboot flag may be indicative of the reset operation of the host, the control circuit may be further configured to update the authorization state to indicate absence of an authorization between the control circuit and the host after the reset operation, and wherein when the authorization state is updated to indicate the absence of the authorization, the control circuit may be further configured to restrict the access of the host to the plurality of secure functions, thereby regulating the access of the host.

In some embodiments, when the control circuit may restrict the access of the host to the plurality of secure functions, the authorization between the host and the control circuit may be initiated by the host.

In some embodiments, when the authorization between the control circuit and the host may be successful based on the initiation of the authorization after the reset operation of the host, the control circuit may be further configured to update the authorization state to indicate a successful authorization between the control circuit and the host after the reset operation of the host. When the authorization state indicates the successful authorization after the reset operation, the control circuit may be further configured to grant the host access to the plurality of secure functions, thereby regulating the access of the host.

In some embodiments, when the authorization between the control circuit and the host may be a failure upon the initiation of the authorization after the reset operation of the host, the control circuit may restrict the access of the host to the plurality of secure functions.

In some embodiments, the secure memory may be further configured to store a plurality of secure applications, wherein each of the plurality of secure applications may be associated with at least one of the plurality of secure functions.

In some embodiments, the plurality of secure functions may be one of a group consisting of device authorization, payment processing, identity verification, secure messaging, cryptographic operation, access control, digital signature, and tokenization.

In some embodiments, the authorization state may be associated with an authorization between the host and the control circuit, wherein the authorization may be indicative of at least one of a group consisting of trusted binding, multi-factor authorization, token-based authorization, certificate-based authorization, blockchain-based authorization, and behavioral-based authorization.

In some embodiments, the reset alert signal may include at least one of a plurality of secure general-purpose input/output (GPIO) signals and a pad supply signal.

In some embodiments, a state of the pad supply signal may be one of (i) asserted when the host remains ON, and (ii) de-asserted when the host remains OFF during the reset operation, wherein the detector may be further configured to generate the reboot flag based on the de-assertion of the pad supply signal.

In some embodiments, a state of the secure GPIO signal may be asserted during the reset operation, wherein the detector may be further configured to generate the reboot flag based on the assertion of the secure GPIO signal.

In some embodiments, the detector may be further configured to transition from a low power mode to a normal mode upon receiving the reset alert signal, wherein during the normal mode, the detector may generate the reboot flag indicative of the reboot state of the host, and wherein during the low power mode, the detector may be further configured to operate in a low energy consumption state.

In another embodiment, an access regulating method may comprise receiving a reset alert signal by a detector of an integrated circuit (IC) from a host. The method may comprise detecting, by the detector, a reboot state of the host based on the reset alert signal, wherein a state of the reset alert signal may toggle during a reset operation of the host. The method may comprise generating, by the detector, a reboot flag based on the reboot state of the host. Further, the method may comprise receiving, by a control circuit of the IC, an access request from the host to access a plurality of secure functions of the IC. The method may comprise determining, by the control circuit, upon receiving the access request, a status of the reboot flag and an authorization state between the host and the control circuit. Additionally, the method may comprise regulating, by the control circuit, based on the status of the reboot flag and the authorization state, access of the host to the plurality of secure functions.

In some embodiments, the method may further comprise storing, by a secure memory of the IC, the reboot flag, and providing, by the secure memory, based on the access request, the reboot flag to the control circuit.

In some embodiments, the method may further comprise generating, by the control circuit, based on the access request received from the host, a status request that may be indicative of detecting the reboot state of the host. The method may further comprise transmitting, by the control circuit, the status request to the detector, wherein the reboot flag may be received by the control circuit from the secure memory based on the transmission of the status request to the detector.

In some embodiments, the method may further comprise updating, by the control circuit, upon determining that the authorization state may indicate a successful authorization between the control circuit and the host before the reset operation of the host, and the status of the reboot flag may be indicative of the reset operation of the host, the authorization state to indicate absence of an authorization between the control circuit and the host after the reset operation of the host. The method may further comprise restricting, by the control circuit, when the authorization state may be updated to indicate the absence of the authorization between the control circuit and the host after the reset operation of the host, the access of the host to the plurality of secure functions, thereby regulating the access of the host.

In some embodiments, when the access of the host to the plurality of secure functions is restricted, the authorization between the host and the control circuit may be initiated after the reset operation of the host.

In some embodiments, the method may further comprise updating, by the control circuit, upon the authorization between the control circuit and the host being successful after the reset operation of the host, the authorization state to indicate a successful authorization between the control circuit and the host after the reset operation of the host. The method may further comprise granting, by the control circuit, when the authorization state may indicate the successful authorization after the reset operation, the access of the host to the plurality of secure functions, thereby regulating the access of the host.

In the present disclosure, the term "assert" is used to mean placing a signal in an active state. For example, for an active-low signal, the signal is at a logic-low state when asserted, and for an active-high signal, the signal is at a logic-high state when asserted.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit (IC) comprising:
    a detector coupled to a host, wherein the detector is configured to:
        receive a reset alert signal from the host;
        detect a reboot state of the host based on a state of the reset alert signal, wherein the state of the reset alert signal toggles during a reset operation of the host; and
        generate a reboot flag based on the reboot state of the host; and
    a control circuit coupled to the detector and the host, wherein the control circuit is configured to:
        receive an access request from the host to access a plurality of secure functions of the IC;
        determine, upon receiving the access request, a status of the reboot flag and an authorization state of the host; and
        regulate, based on the status of the reboot flag and the authorization state, access of the host to the plurality of secure functions.

2. The IC of claim 1, further comprising a secure memory coupled to the detector and the control circuit, wherein the secure memory is configured to:
    store the reboot flag; and
    provide, based on the access request, the reboot flag to the control circuit.

3. The IC of claim 2, wherein the control circuit is further configured to:
    generate, based on the access request received from the host, a status request; and
    transmit the status request to the detector, wherein the control circuit receives the reboot flag from the secure memory based on the transmission of the status request to the detector.

4. The IC of claim 3,
    wherein when the control circuit determines that the authorization state is associated with a successful authorization between the control circuit and the host before the reset operation of the host and the status of the reboot flag is indicative of the reset operation of the host, the control circuit is further configured to update the authorization state to indicate absence of an authorization between the control circuit and the host after the reset operation of the host, and
    wherein when the authorization state is updated to indicate the absence of the authorization, the control circuit is further configured to restrict the access of the host to the plurality of secure functions, thereby regulating the access of the host.

5. The IC of claim 4,
wherein when the control circuit restricts the access of the host to the plurality of secure functions, the authorization between the host and the control circuit is initiated by the host.

6. The IC of claim 5,
wherein when the authorization between the control circuit and the host is successful based on the initiation of the authorization after the reset operation of the host, the control circuit is further configured to update the authorization state to indicate a successful authorization between the control circuit and the host after the reset operation of the host, and
wherein when the authorization state indicates the successful authorization after the reset operation, the control circuit is further configured to grant the host access to the plurality of secure functions, thereby regulating the access of the host.

7. The IC of claim 5,
wherein when the authorization between the control circuit and the host is a failure upon the initiation of the authorization after the reset operation of the host, the control circuit restricts the access of the host to the plurality of secure functions.

8. The IC of claim 2, wherein the secure memory is further configured to store a plurality of secure applications, and wherein each of the plurality of secure applications is associated with at least one of the plurality of secure functions.

9. The IC of claim 1, wherein the plurality of secure functions is one of a group consisting of device authorization, payment processing, identity verification, secure messaging, cryptographic operation, access control, digital signature, and tokenization.

10. The IC of claim 1, wherein the authorization state is associated with an authorization between the host and the control circuit, and wherein the authorization is indicative of at least one of a group consisting of trusted binding, multi-factor authorization, token-based authorization, certificate-based authorization, blockchain-based authorization, and behavioral-based authorization.

11. The IC of claim 1, wherein the reset alert signal includes at least one of a secure general-purpose input/output (GPIO) signal and a pad supply signal.

12. The IC of claim 11, wherein a state of the pad supply signal is one of (i) asserted when the host remains ON, and (ii) de-asserted when the host remains OFF during the reset operation, and wherein the detector is further configured to generate the reboot flag based on the de-assertion of the pad supply signal.

13. The IC of claim 11, wherein a state of the secure GPIO signal is asserted during the reset operation, and wherein the detector is further configured to generate the reboot flag based on the assertion of the secure GPIO signal.

14. The IC of claim 1, wherein the detector is further configured to transition from a low power mode to a normal mode upon receiving the reset alert signal, wherein during the normal mode, the detector generates the reboot flag indicative of the reboot state of the host, and wherein during the low power mode, the detector is further configured to operate in a low energy consumption state.

15. An access regulating method comprising:
receiving a reset alert signal by a detector of an integrated circuit (IC) from a host;
detecting, by the detector, a reboot state of the host based on the reset alert signal wherein a state of the reset alert signal toggles during a reset operation of the host;
generating, by the detector, a reboot flag based on the reboot state of the host;
receiving, by a control circuit of the IC, an access request from the host to access a plurality of secure functions of the IC;
determining, by the control circuit, upon receiving the access request, a status of the reboot flag and an authorization state between the host and the control circuit; and
regulating, by the control circuit, based on the status of the reboot flag and the authorization state, access of the host to the plurality of secure functions.

16. The access regulating method of claim 15, further comprising:
storing, by a secure memory of the IC, the reboot flag; and
providing, by the secure memory, based on the access request, the reboot flag to the control circuit.

17. The access regulating method of claim 16, further comprising:
generating, by the control circuit, based on the access request received from the host, a status request that is indicative of detecting the reboot state of the host; and
transmitting, by the control circuit, the status request to the detector, wherein the reboot flag is received by the control circuit from the secure memory based on the transmission of the status request to the detector.

18. The access regulating method of claim 17, further comprising:
updating, by the control circuit, upon determining that the authorization state indicates a successful authorization between the control circuit and the host before the reset operation of the host, and the status of the reboot flag is indicative of the reset operation of the host, the authorization state to indicate absence of an authorization between the control circuit and the host after the reset operation of the host; and
restricting, by the control circuit, when the authorization state is updated to indicate the absence of the authorization between the control circuit and the host after the reset operation of the host, the access of the host to the plurality of secure functions, thereby regulating the access of the host.

19. The access regulating method of claim 18, wherein when the access of the host to the plurality of secure functions is restricted, the authorization between the host and the control circuit is initiated after the reset operation of the host.

20. The access regulating method of claim 19, further comprising:
updating, by the control circuit, upon the authorization between the control circuit and the host being successful after the reset operation of the host, the authorization state to indicate a successful authorization between the control circuit and the host after the reset operation of the host; and
granting, by the control circuit, when the authorization state indicates the successful authorization after the reset operation, the access of the host to the plurality of secure functions, thereby regulating the access of the host.

* * * * *